UNITED STATES PATENT OFFICE.

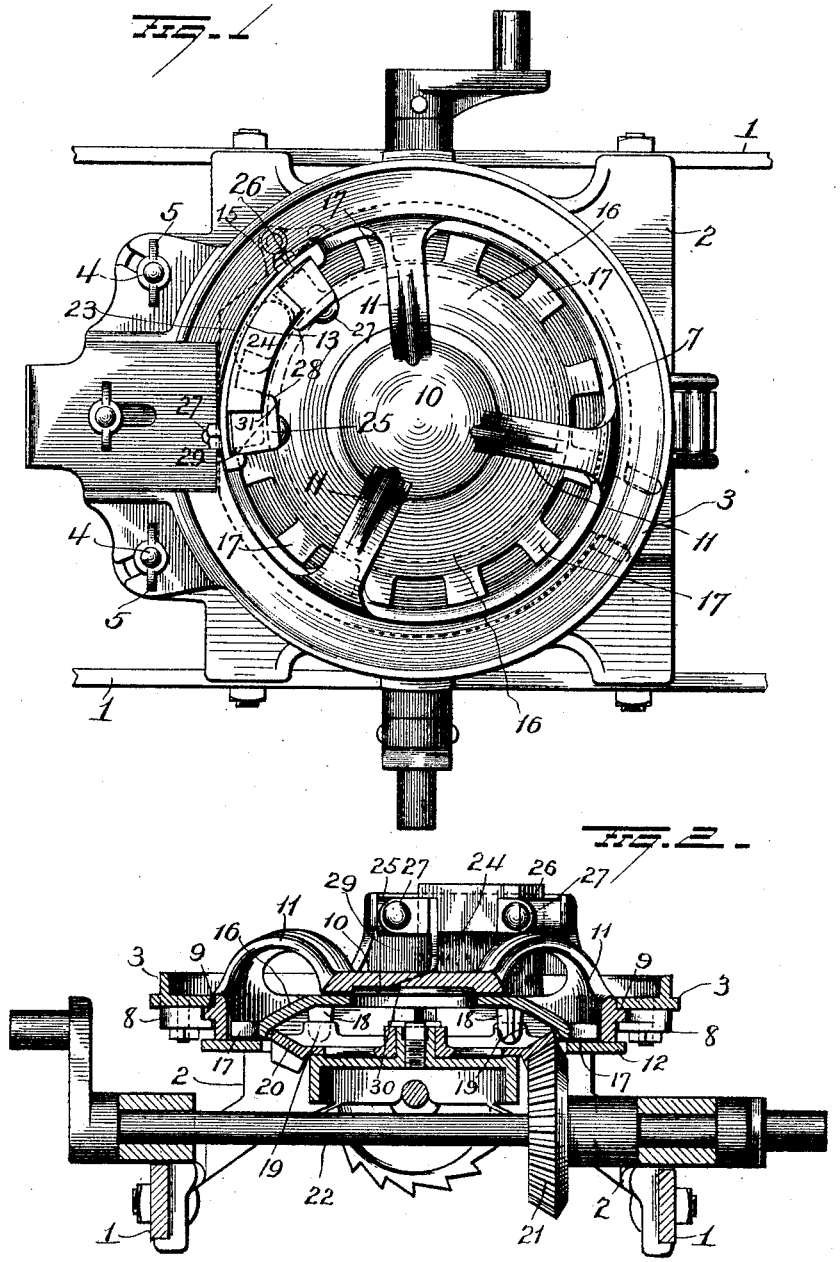

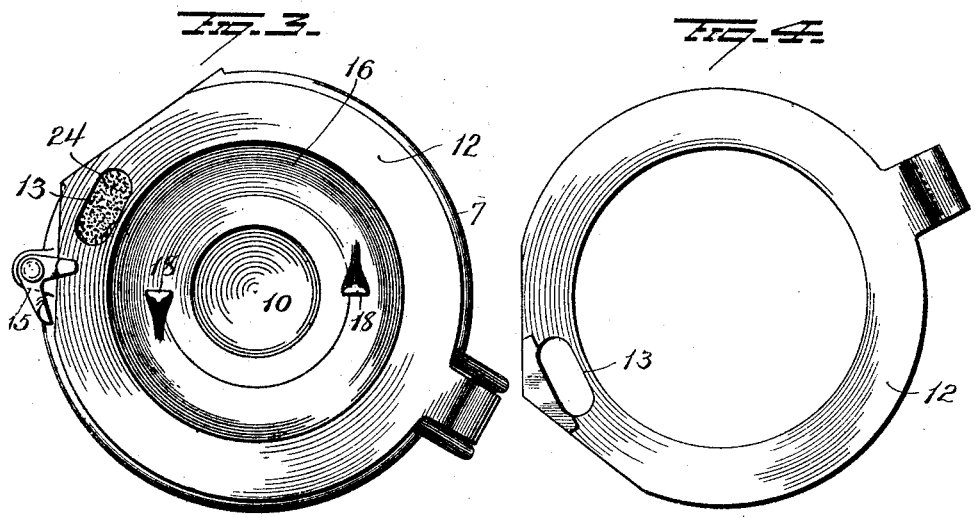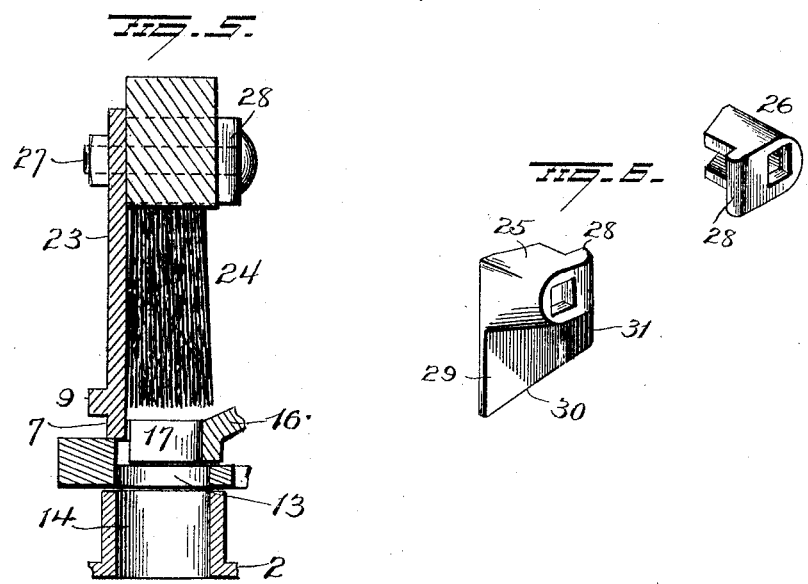

EDWARD M. HEYLMAN, OF SOUTH BEND, INDIANA, ASSIGNOR TO OLIVER CHILLED PLOW WORKS, OF SOUTH BEND, INDIANA.

SEED-FEEDING MECHANISM FOR PLANTERS.

1,111,960.     Specification of Letters Patent.     Patented Sept. 29, 1914.

Application filed April 28, 1914. Serial No. 834,963.

*To all whom it may concern:*

Be it known that I, EDWARD M. HEYLMAN, of South Bend, in the county of St. Joseph and State of Indiana, have invented certain new and useful Improvements in Seed-Feeding Mechanism for Planters; and I do hereby declare the following to be a full, clear, and exact description of the invention, such as will enable others skilled in the art to which it appertains to make and use the same.

This invention relates to improvements in planters, and more particularly to feed mechanism therefor,—one object of the invention being to provide simple and efficient feeding mechanism which shall be adaptable more particularly for feeding peanuts, but also capable for use for feeding seed.

A further object is to so construct the feed mechanism as to avoid possibility of the peanuts becoming crowded or crushed and so as to relieve the brush cut-off from undue interference or excessive rubbing by the peanuts in the seed can.

With these and other objects in view, the invention consists in certain novel features of construction and combinations of parts as hereinafter set forth and pointed out in the claims.

In the accompanying drawings; Figure 1 is a plan view showing a feed mechanism embodying my improvements; Fig. 2 is a transverse sectional view; and Figs. 3, 4, 5 and 6 are detail views.

1 represents the main frame beams, between which a base frame 2 is secured so as to be supported by said main frame. A base ring 3 is removably attached to the base frame and is normally secured thereto by means of bolts 4 provided with thumb nuts 5.

The base ring 3 forms a seat for a seed can (not shown), and within said base ring, an annular frame 7 is located and held (removably) therein by means of buttons 8 mounted on the base ring and engaging a peripheral flange 9 on the annular frame 7. The annular frame 7 is provided with a comparatively small central disk 10 connected with the circular portion of the frame by a plurality of upwardly curved arms 11,—all parts of said annular frame being preferably made in a single casting. The annular frame is hinged to a feed ring 12 located under the same and provided with an elongated feed outlet 13, which directs the peanuts to a discharge outlet 14 in the base frame, and from the latter outlet the peanuts may be directed to the ground by any suitable means, not shown. A latch 15 normally secures the parts 7 and 12 in fixed relation to each other.

A toothed feed disk 16 is loosely mounted upon the feed ring 12 and within the annular frame 7, said disk having a general convex contour with a central opening covered by the disk 10 and the teeth 17 of said feed disk (which are suitably spaced apart to receive single peanuts between them) are adapted to move peanuts to the outlet openings of the feed ring 12 and discharge them therethrough.

The feed disk 16 is provided on its under side with lugs 18 to be engaged by lugs 19 on a horizontal gear wheel 20 mounted on the base frame 2. This gear wheel receives motion from a pinion 21 secured to a driving shaft 22 mounted in said base frame. This shaft 22 may be rotated by any suitable driving mechanism.

The peripheral wall of the annular frame 7 is provided with an upward extension 23 and to this extension, the curved head of a brush cut-off 24 is secured by means of lugs 25, 26. Each of these lugs is secured to the extension 23 by means of a bolt 27 and each lug is provided with a lip 28 to engage the brush head. The extension 23 is so located that when the brush cut-off is secured thereto, the latter will be disposed over the outlet opening 13 of the feed ring 12 and the bristles of the brush should be so positioned that their lower ends be in close proximity to the feed disk 16 as the latter rotates and its teeth move under said brush. The lug 25 is made with a downward extension which forms a guard 29, which partially embraces the brush cut-off. The guard 29 is so formed that its inner face extends inwardly from the inner wall of the extension 23 and past one side edge of the brush,—said inner face of the guard being thus disposed tangentially with respect to the feed disk and projecting partially over the same. The lower end 30 of the guard terminates an appreciable distance above the teeth of the feed disk and is inclined upwardly from the extension 23 to the lower inner corner of the guard. The inner face of the guard is curved toward the brush at the short side of said guard, as indicated at 31.

By mounting the brush cut-off and providing a guard as above described, the brush cut-off will be attached to the inner side of the wall of the annular frame extension and there is no dead wall inwardly of the brush and over the feed disk, against which the peanuts might lodge and become crushed. Furthermore the guard 29 will operate to ward off the mass of peanuts in the lower part of the can, from the brush and cause them to move toward the center of the can,—thus preventing the peanuts from unduly rubbing against the side of the brush. The inclined lower edge of the guard extends downwardly from the inner edge of the guard toward the feed disk, so that there will be just enough room for a peanut lying flat to pass under. By making the lower edge of the guard inclined as above described, wedging of a peanut under the guard will be avoided.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In a feed mechanism, the combination with an annular frame, a feed ring having an outlet opening and a feed disk having peripheral teeth, of a brush cut-off supported by the annular frame over the outlet of the feed ring and over the path of the feed disk teeth, of a guard at one side of the brush, said guard having an inner face tangential to the feed disk and having its lower edge inclined upwardly from the wall of the annular frame.

2. In a feed mechanism, the combination of an annular frame having an upward extension, a feed ring connected with said frame and having an outlet opening below said upward extension, a toothed feed disk over said feed ring, a brush cut-off alongside the inner face of said extension, and lugs secured to the said extension and engaging the head of said brush cut-off.

In testimony whereof, I have signed this specification in the presence of two subscribing witnesses.

EDWARD M. HEYLMAN.

Witnesses:
EDWIN NICAR,
KATE E. BUCKLEY.

Copies of this patent may be obtained for five cents each, by addressing the "Commissioner of Patents, Washington, D. C."